United States Patent [19]
Yabe et al.

[11] Patent Number: 5,752,884
[45] Date of Patent: May 19, 1998

[54] DAMPING DEVICE FOR TORQUE CONVERTER

[75] Inventors: Hiroshi Yabe, Kakegawa; Shiro Takeuchi, Shizuoka-ken, both of Japan

[73] Assignee: NSK-Warner K.K., Tokyo, Japan

[21] Appl. No.: 709,523

[22] Filed: Sep. 6, 1996

[30] Foreign Application Priority Data

Sep. 7, 1995 [JP] Japan ................... 7-230051

[51] Int. Cl.$^6$ .................................................. F16D 3/14
[52] U.S. Cl. ........................................ 464/67; 192/3.29
[58] Field of Search ................... 464/66, 67; 192/3.29, 192/213.1, 213.2; 74/574

[56] References Cited

U.S. PATENT DOCUMENTS

| | | |
|---|---|---|
| 4,702,721 | 10/1987 | Larmarche ................... 464/67 |
| 4,716,998 | 1/1988 | Tsukamoto et al. ........... 464/67 X |
| 4,987,980 | 1/1991 | Fujimoto ..................... 192/3.29 X |
| 5,020,647 | 6/1991 | Fujimoto et al. ............. 192/3.29 |
| 5,080,215 | 1/1992 | Forster et al. ............... 464/67 X |
| 5,246,399 | 9/1993 | Yanko et al. ................. 464/63 |
| 5,482,151 | 1/1996 | Ookubo et al. ............... 192/3.29 |
| 5,575,364 | 11/1996 | Freidmann et al. ........... 192/3.29 |

FOREIGN PATENT DOCUMENTS

| | | |
|---|---|---|
| 64-74354 | 3/1989 | Japan. |
| 2-248751 | 10/1990 | Japan. |
| 3-194247 | 8/1991 | Japan. |

*Primary Examiner*—Elleen A. Dunn
*Attorney, Agent, or Firm*—Shapiro and Shapiro

[57] ABSTRACT

In a lock-up piston and damper device for a torque converter, a divider member is provided between the retainer plate and the lock-up piston for supporting springs of an internal circumference in series with springs of an external circumference, thereby obtaining a large torsion angle.

1 Claim, 4 Drawing Sheets

DAMPING DEVICE FOR TORQUE CONVERTER

BACKGROUND OF THE INVENTION

1. Field of the Invention

The present invention relates to a lock-up piston integrated damper device adapted for use in a torque converter with a lock-up mechanism for an automatic transmission for vehicles and more particularly to such a damper device of simple structure with a large torsion angle and with improved damping characteristics.

2. Related Background Art

In general, the torque converter realizes smooth running of the vehicle by power transmission through fluid, but increases the fuel consumption because of energy loss by fluid slippage. For avoiding such drawback, the recent torque converter is equipped with a lock-up mechanism.

The lock-up mechanism is composed of a lock-up clutch having a friction face, wherein the fluid flow in the torque converter automatically varies (when the velocity of the vehicle exceeds a predetermined value), to press the friction face of a piston of the lock-up clutch against a front cover of the torque converter, thereby directly coupling the engine with the driven wheels. Thus the influence of the fluid slippage can be eliminated to improve the fuel consumption.

Such torque converter is provided with a damper device, consisting of plural springs, in order to absorb the variation in the engine torque, resulting at the coupling and decoupling of the piston (lock-up piston) of the lock-up clutch with the front cover of the torque converter.

A conventional damper device for the lock-up clutch, disclosed for example in the Japanese Patent Laid-Open Application No. 2-248751, is composed of a retaining plate and a side plate, fixed respectively on the external and internal circumferences in the radial direction of the piston.

Also the Japanese Patent Laid-Open Application No. 64-75354 discloses a configuration in which the retaining plate and the side plate are integrally fixed with rivets.

In such conventional damper devices, however, it has been difficult to obtain a large torsion angle, because the springs on the inner or internal and outer or external circumferences function in parallel manner or with a delay by a certain angle.

For this reason the lock-up mechanism cannot be activated at a low vehicle velocity involving vibration and noises, and it has been difficult to improve the fuel consumption at such velocity.

In lock-up clutches disclosed in Japanese Patent Laid-Open Application No. 3-194247 and U.S. Pat. No. 5,246,399, the damper device is not integral with the lock-up piston. Therefore, an axial width of the damper device will be greater and the number of parts will increase.

SUMMARY OF THE INVENTION

An object of the present invention is to provide a damper device, for use in the lock-up clutch, capable of providing a large torsion angle and exhibiting excellent damping characteristics, by causing serial function of plural springs on the internal circumference with those on the external circumference.

The above-mentioned object can be attained, according to the present invention, by a damper device for use in a torque converter with a lock-up mechanism, including a lock-up clutch which is movable between a coupled state and a liberated state, and a torque converter body for power transmission by fluid, the damper device comprising:

a lock-up piston of the input side;

plural springs provided on an external circumference and an internal circumference of the lock-up piston;

a retainer plate for retaining the springs on the external and internal circumferences;

a divider member rotatably positioned between the lock-up piston and the retainer plate, for continuously retaining the springs on the external and internal circumferences; and an output member having a portion in impingement with the end faces of the springs on the internal or external circumference and connected to the output side.

A large torsion angle can be obtained by positioning the divider member for serially coupling the springs of the external and internal circumferences, thereby causing serial function of the springs of the internal circumference and those of the external circumference.

DESCRIPTION OF THE PREFERRED EMBODIMENTS

Now the present invention will be explained in detail, with reference to the attached drawings. It is to be noted that the embodiments explained in the following are merely given as examples and by no means limit the present invention. In the attached drawings, mutually same parts are represented by same numbers.

Figure 1:
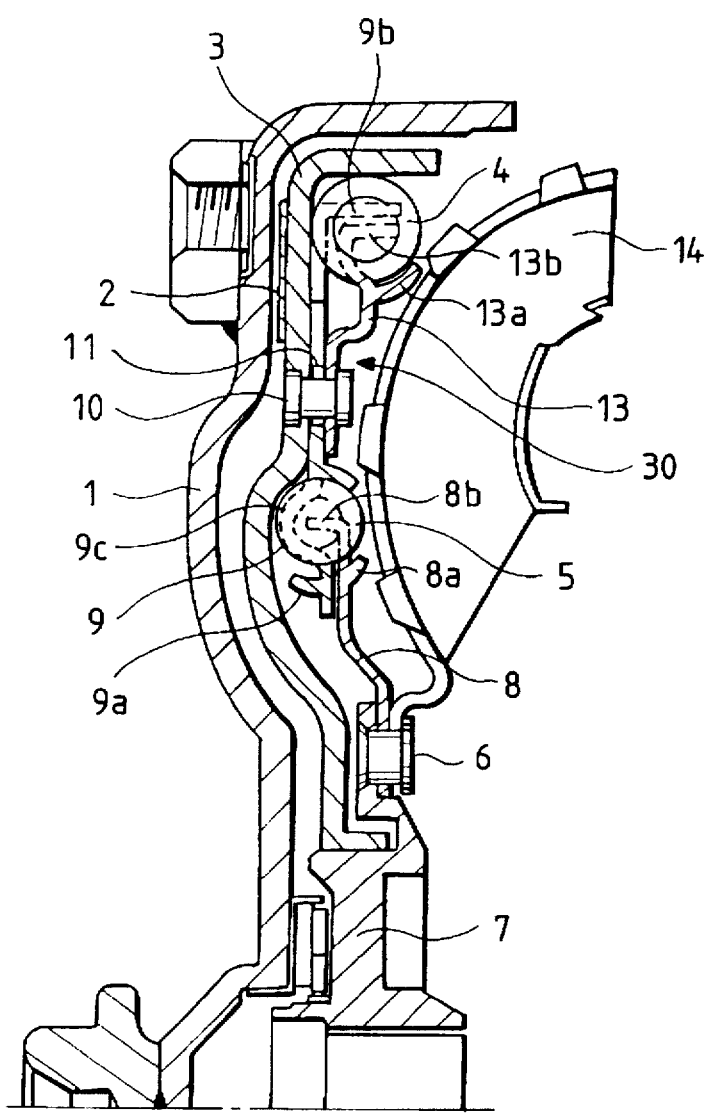
FIG. 1 is an axial cross-sectional view of a damper device constituting a first embodiment of the present invention.

FIG. 1 is an axial cross-sectional view of a damper device 30, constituting a first embodiment of the present invention, in a liberated state of the lock-up clutch.

The damper device 30 is provided with a retainer plate 13, which is fixed, at an end on the internal periphery, to an input piston (lock-up piston) 3 by means of rivets 10 and supports springs 4 of an external circumference, and an output member or a clutch plate 8 which is fixed to a turbine hub 7 by means of rivets 6. The rivets 10 fix the retainer plate 13 to the lock-up piston 3 in plural circumferential positions.

The damper device 30 is further provided with a divider member 9 which is positioned between the lock-up piston 3 and the retainer plate 13 and is rendered circumferentially rotatable with respect to the lock-up piston 3 and the rivets 10, and plural springs 4 of an external circumference and plural springs 5 of an internal circumference, respectively positioned in circumferential direction. These springs of the external and internal circumferences are composed of torsion springs.

A friction member 2 is provided on the external face of the lock-up piston 3. Thus, when the lock-up piston 3 is axially moved to come into contact with the internal face of a front cover 1, it is maintained in a coupled state with the front cover 1 across the friction member 2, whereby the torque is transmitted by direct coupling of the two.

A turbine runner 14, constituting the output member of the torque converter unit, is fixed to the turbine hub 7 by the rivets 6.

The retainer plate 13 is provided, at the end thereof at the external periphery, with spring supporting portions 13a for supporting the springs 4 of the external circumference and end face torque transmitting portions 13b for torque transmission by engagement with the springs 4 of the external circumference. Also the clutch plate 8 is provided, at an end thereof opposite to the side fixed to the turbine hub 7 by the rivets 6, with spring supporting portions 8a for supporting the springs 5 of the internal circumference and torque transmitting finger portions 8b for torque transmission by engagement with the springs 5 of the internal circumference.

Figure 2:
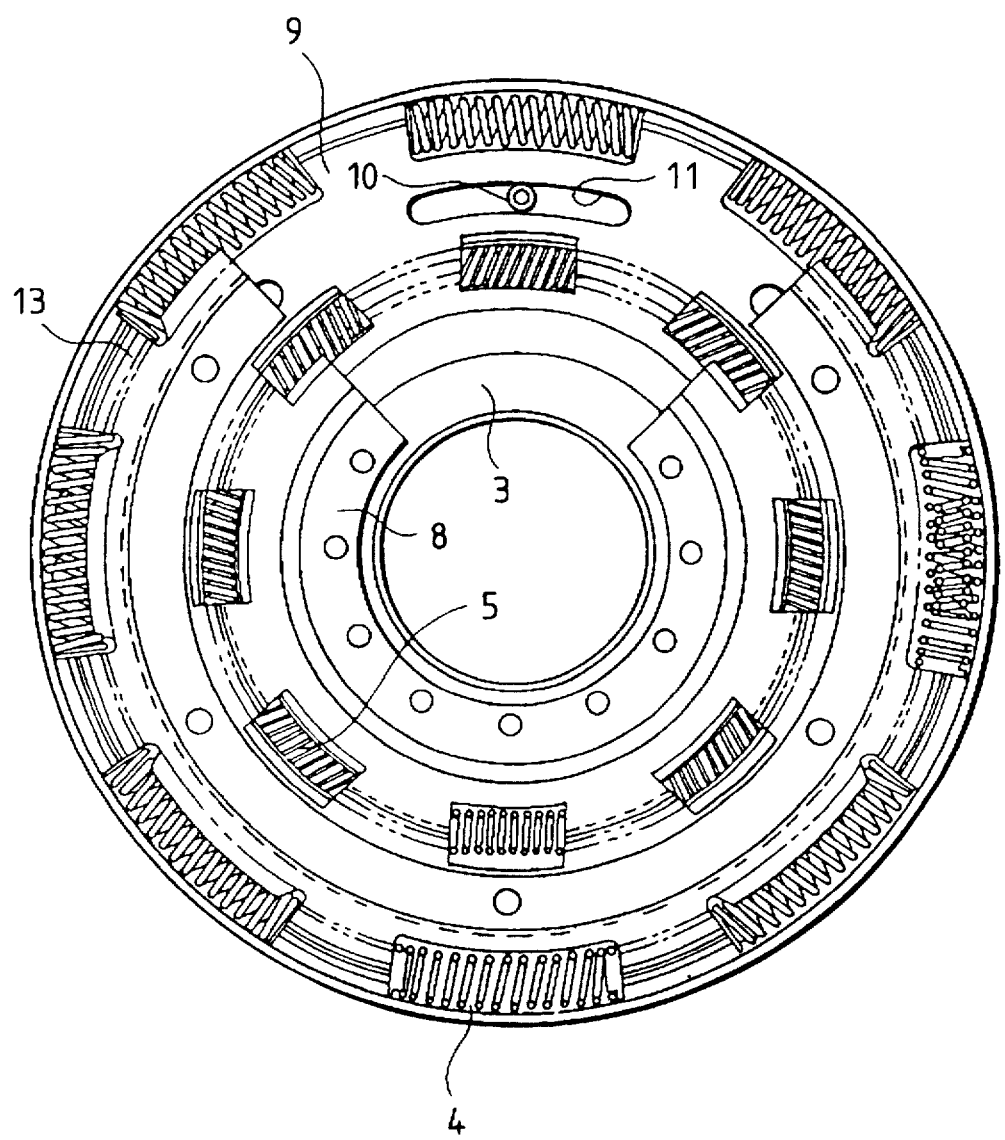
FIG. 2 is an elevation view of the damper device shown in FIG. 1, seen from the right.

The divider member 9 is circumferentially movable with respect to the lock-up piston 3. However, as the rivets 10 fit in elongated holes 11 of the divider member 9 as shown in FIG. 2, the circumferential movement of the divider member 9 is limited by impingement of the rivet 10 on both ends of the elongated hole 11. Consequently, the divider member 9 is rendered rotatable only for a distance corresponding to the circumferential length of the elongated hole 11.

The divider member 9 is provided, at the external side thereof, with torque transmitting finger portions 9b for torque transmission by engagement with the springs 4 of the external circumference, and, at the internal side thereof, with torque transmitting portions 9c for torque transmission by engagement with the springs 5 of the internal circumference. At the end at the internal periphery, there are provided spring supporting portions 9a for supporting the springs 5 of the internal circumference.

In the first embodiment explained above, the torque is transmitted in a path through the lock-up (input) piston 3 directly coupled with the front cover 1 of the engine side through the friction member 2, the retainer plate 13, the springs 4 of the external circumference, the divider member 9, the springs 5 of the internal circumference and the clutch plate 8 constituting the output member.

As will be apparent from the foregoing explanation, the springs of the external circumference and those of the internal circumference in the damper device are securely maintained in serial state, as the divider member supports these springs of the external and internal circumferences in continuous manner.

In the following there will be explained a second embodiment of the present invention, with reference to FIG. 3.

Figure 3:
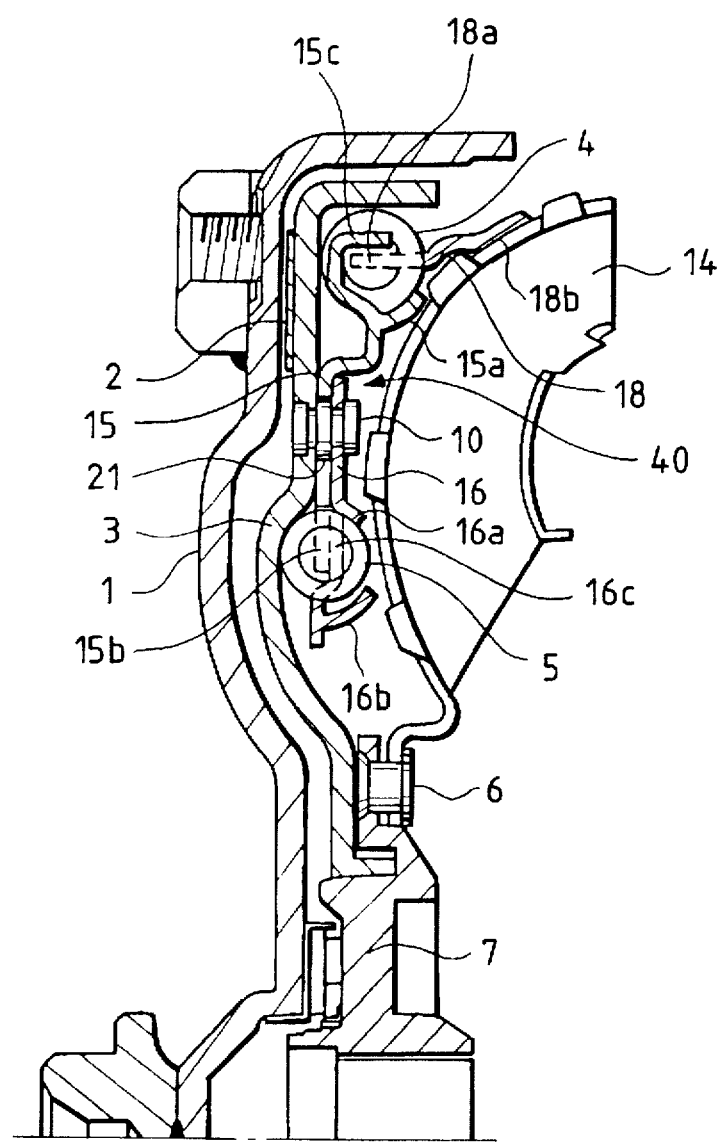
FIG. 3 is an axial cross-sectional view of a damper device constituting a second embodiment of the present invention.

FIG. 3 is an axial cross-sectional view of a damper device 40, constituting a second embodiment of the present invention, in a liberated state of the lock-up clutch.

The damper device 40 is provided with a retainer plate 16, which is fixed, at an end on the external periphery, to an input piston (lock-up piston) 3 by means of rivets 10 and supports springs 5 of an internal circumference, and an output member 18. The rivets 10 fix the retainer plate 16 to the lock-up piston 3 in plural circumferential positions.

The damper device 40 is further provided with a divider member 15 which is positioned between the lock-up piston 3 and the retainer plate 16 and is rendered circumferentially rotatable with respect to the lock-up piston 3 and the rivets 10, and plural springs 4 of an external circumference and plural springs 5 of an internal circumference, respectively positioned in circumferential direction. These springs of the external and internal circumferences are composed of torsion springs.

A friction member 2 is provided on the external face of the lock-up piston 3. Thus, when the lock-up piston 3 is axially moved to come into contact with the internal face of a front cover 1, it is maintained in a coupled state with the front cover 1 across the friction member 2, whereby the torque is transmitted by direct coupling of the two.

A turbine runner 14, constituting the output member of the torque converter unit, is fixed to the turbine hub 7 by the rivets 6.

The retainer plate 16 is provided, at the end thereof on the internal periphery, with spring supporting portions 16a for supporting the springs 5 of the internal circumference and torque transmitting portions 16c for torque transmission by engagement with the springs 5 of the internal circumference.

Figure 4:
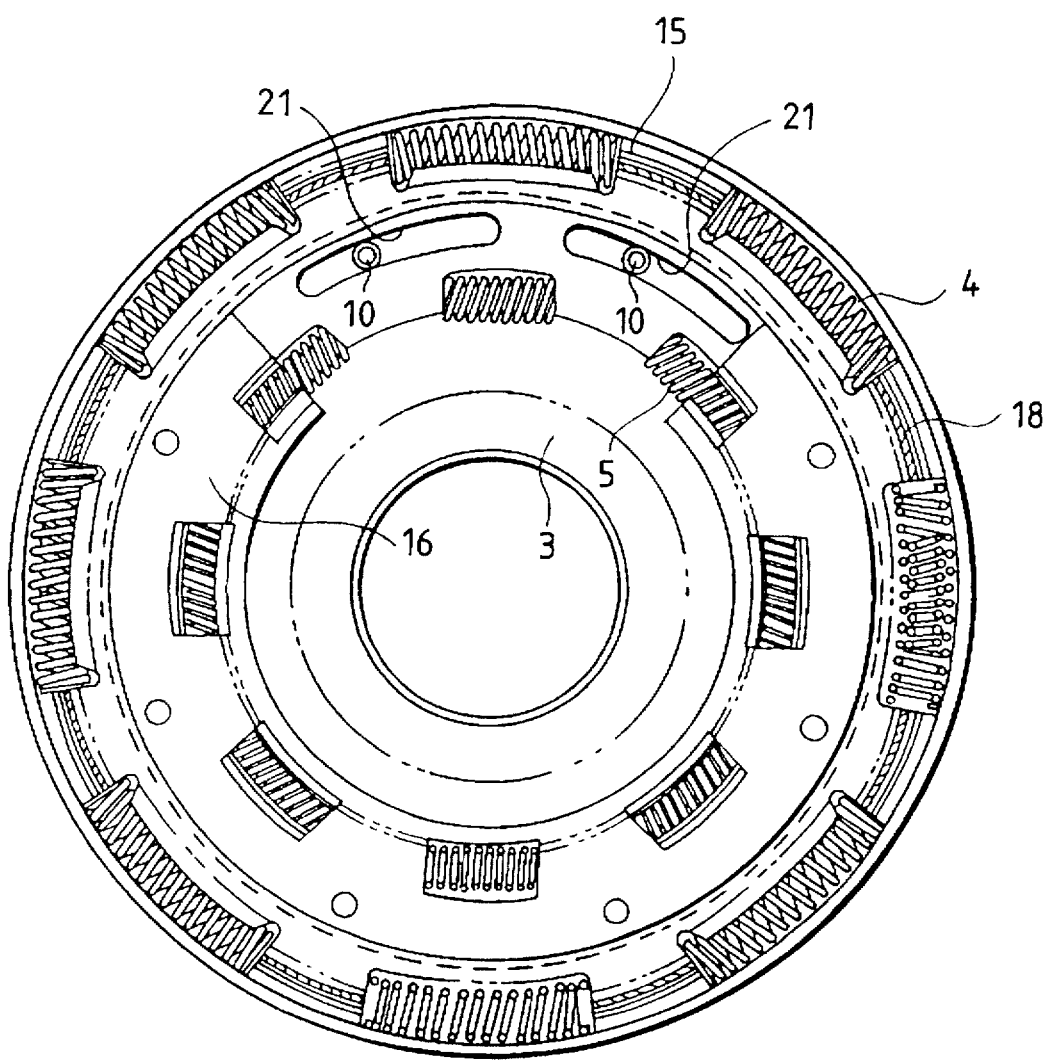
FIG. 4 is an elevation view of the damper device shown in FIG. 3, seen from the right.

The divider member 15 is circumferentially movable with respect to the lock-up piston 3. However, as the rivets 10 fit in elongated holes 21 of the divider member 15 as shown in FIG. 4, the circumferential movement of the divider member 15 is limited by impingement of the rivet 10 on both ends of the elongated hole 21. Consequently, the divider member 15 is rendered rotatable only for a distance corresponding to the circumferential length of the elongated hole 21.

The divider member 15 is provided, at the external side thereof, with torque transmitting finger portions 15c for torque transmission by engagement with the springs 4 of the external circumference, and, at the internal side thereof, with torque transmitting portions 15b. At the end at the external periphery, there are provided spring supporting portions 15a for supporting the springs 4 of the external circumferences.

The output member 18 is fixed, by fixing portions 18b, to the external face of the turbine runner 14, and is provided with torque transmitting finger portions 18a, for torque transmission by engagement with the springs 4 of the external circumference.

As will be apparent from the foregoing explanation, the springs of the external circumference and those of the internal circumference in the damper device are securely maintained in serial state, as the divider member supports these springs of the external and internal circumferences in continuous manner.

In the second embodiment explained above, the torque is transmitted in a path through the lock-up (input) piston 3 directly coupled with the front cover 1 of the engine side through the friction member 2, the retainer plate 16, the springs 5 of the internal circumference, the divider member 15, the springs 4 of the external circumference and the output member 8 at the output side.

As explained in the foregoing, the first and second embodiments of the present invention provide a maximum damping characteristic, as the springs 5 of the internal circumference and those 4 of the external circumference function serially through the divider member 9 or 15.

Consequently the present invention provides the following advantages.

The function of the springs of the internal circumference and those of the external circumference in serial manner allows to provide a large torsion angle, thereby ensuring damping characteristics of a wide angular range. It is therefore possible to improve the vibration attenuating effect, and to expand the lock-up range, thereby contributing to the reduction in the fuel consumption of the vehicle.

Also the damper device of the present invention is compact because the divider member is positioned between the lock-up piston and the retainer plate, and is advantageous in cost since the number of component parts is maintained at a minimum.

In the above-mentioned first and second embodiments, the lock-up piston is integrally provided with the damper device so that the number of the parts is decreased.

What is claimed is:

1. A lock-up piston integrated damper device for use in a torque converter provided with a lock-up mechanism movable between a coupled state and a liberated state and a torque converter body for power transmission with fluid, said lock-up piston integrated damper device comprising:

a lock-up piston;

plural sets of springs respectively positioned toward an external circumference and an internal circumference on said lock-up piston;

a retainer plate supporting the springs of one of said external and internal circumferences;

a divider member rotatably provided between said lock-up piston and said retainer plate for continuously supporting the springs of said external and internal circumferences such that the springs of said external circumference are retained in series with the springs of said internal circumference in said divider member; and an output member having portions supporting the springs of the other said internal and external circumferences.

* * * * *